(12) United States Patent
Schweizer et al.

(10) Patent No.: US 12,257,625 B2
(45) Date of Patent: Mar. 25, 2025

(54) METHOD AND DEVICE FOR RAPID THREE-DIMENSIONAL WORKPIECE FROM A MOLTEN MATERIAL

(71) Applicant: Robert Bosch GmbH, Stuttgart (DE)

(72) Inventors: Benjamin Schweizer, Horb (DE); Eberhard Maier, Koengen (DE); Peter Voehringer, Kornwestheim (DE); Roland Bleher, Benningen (DE)

(73) Assignee: Robert Bosch GmbH, Stuttgart (DE)

( * ) Notice: Subject to any disclaimer, the term of this patent is extended or adjusted under 35 U.S.C. 154(b) by 819 days.

(21) Appl. No.: 17/600,260

(22) PCT Filed: Feb. 7, 2020

(86) PCT No.: PCT/EP2020/053103
§ 371 (c)(1),
(2) Date: Sep. 30, 2021

(87) PCT Pub. No.: WO2020/200552
PCT Pub. Date: Oct. 8, 2020

(65) Prior Publication Data
US 2022/0176451 A1    Jun. 9, 2022

(30) Foreign Application Priority Data
Apr. 1, 2019 (DE) .................. 10 2019 204 566.9

(51) Int. Cl.
*B22F 10/22* (2021.01)
*B22D 23/00* (2006.01)
(Continued)

(52) U.S. Cl.
CPC ............ *B22F 10/22* (2021.01); *B22D 23/003* (2013.01); *B22F 12/53* (2021.01); *B33Y 10/00* (2014.12);
(Continued)

(58) Field of Classification Search
CPC .......... B22F 10/22; B22F 12/53; B22F 12/57; B22F 3/115; B22D 23/003; B33Y 10/00; B33Y 30/00; B41J 2/14201; B41J 2/04
(Continued)

(56) References Cited

U.S. PATENT DOCUMENTS 5,598,200 A * 1/1997 Gore ........................ B22F 9/08
    347/88
5,803,106 A * 9/1998 Cohen ................... F23D 11/345
    137/13
(Continued)

FOREIGN PATENT DOCUMENTS

CN      103442876 A     12/2013
CN      103785834 A     5/2014
(Continued)

OTHER PUBLICATIONS

Translation of International Search Report for Application No. PCT/EP2020/053103 dated Mar. 20, 2020 (2 pages).

*Primary Examiner* — Jessee R Roe
*Assistant Examiner* — Michael Aboagye
(74) *Attorney, Agent, or Firm* — Michael Best & Friedrich LLP

(57) ABSTRACT

The invention relates to a method for the rapid manufacture of a three-dimensional workpiece from a molten material (1), in particular a molten metal, in which method the molten material (1) is supplied to a compression chamber (2) and delivered in drop form via an injector hole (4) by means of a pressure pulse which is generated with the aid of a reciprocating piston (3) that delimits the compression chamber (2). According to the invention, the compression chamber (2) is degassed before manufacturing begins and/or during a pause in the manufacturing. In a first step, ultrasonic waves are coupled into the molten material (1) in the compression chamber (2), which generate a force ($F_{Bjrk}$) that (Continued)

makes the gas in the molten material (1) sink, and in a second step, after the ultrasonic excitation has ended, the piston (3) is introduced deeper into the compression chamber (2) in order to remove the rising gas via a conduit (5) of the piston (3). The invention also relates to a device for carrying out the method according to the invention.

20 Claims, 2 Drawing Sheets

(51) Int. Cl.
  *B22F 12/53*    (2021.01)
  *B33Y 10/00*    (2015.01)
  *B33Y 30/00*    (2015.01)
  *B22F 12/57*    (2021.01)

(52) U.S. Cl.
  CPC ............ *B33Y 30/00* (2014.12); *B22F 12/57* (2021.01); *B22F 2202/01* (2013.01)

(58) Field of Classification Search
  USPC .......................................... 222/596
  See application file for complete search history.

(56) References Cited

U.S. PATENT DOCUMENTS

| | | | | |
|---|---|---|---|---|
| 9,289,931 | B2 * | 3/2016 | Rendon | B29C 45/73 |
| 9,981,310 | B2 * | 5/2018 | Wang | B22D 1/007 |
| 10,315,247 | B2 * | 6/2019 | Mark | B22F 10/22 |
| 11,931,753 | B2 * | 3/2024 | Schweizer | B05B 1/323 |
| 2002/0111707 | A1 | 8/2002 | Li et al. | |

FOREIGN PATENT DOCUMENTS

| | | |
|---|---|---|
| CN | 107350472 A | 11/2017 |
| CN | 107406670 A | 11/2017 |
| DE | 102016101952 A1 | 8/2016 |
| DE | 102016224047 A1 | 6/2018 |
| JP | 2018090866 A | 6/2018 |

\* cited by examiner

METHOD AND DEVICE FOR RAPID THREE-DIMENSIONAL WORKPIECE FROM A MOLTEN MATERIAL

BACKGROUND OF THE INVENTION

The present invention relates to a method for the generative manufacture of a three-dimensional workpiece from a molten material, in particular a molten metal. The invention furthermore relates to a device for carrying out the method.

Generative manufacturing methods include, in particular, 3D printing, in which liquid or solid materials are built up in layers to form a three-dimensional workpiece. In the present case, therefore, it is in particular a method and a device for 3D printing which are proposed, although only liquid, more specifically liquefied, materials or molten materials, will be used.

German Laid-Open Application DE 10 2016 224 047 A1 discloses, by way of example, a print head for a 3D printer, in particular a metal printer, which has a reservoir, formed in a housing, for holding the metal. The reservoir comprises a melting region and a compression chamber for the molten or liquefied metal, wherein the melting region and the compression chamber are connected in such a way that the liquefied metal is excited to pass through an outlet opening by the movement of a piston. In this process, the liquefied metal is discharged in the form of drops.

3D printing methods that employ the print heads of the type mentioned above are also referred to as "drop-on-demand" methods. In this context, the reproducibility of drop formation represents a particular challenge.

As a rule, reproducibility is not guaranteed if there is gas, in particular air, in the compression chamber, since the gas or the air is very compressible in comparison with the molten material. Since the piston travel for discharging the molten material is generally just a few micrometers or even less than one micrometer, drop ejection is highly dependent on how much of the compressible medium is present in the compression chamber. The amount of gas or air present in the compression chamber may be such that it is not even possible to build up sufficient pressure to force the molten material through the spray hole. The gas or the air may pass into the compression chamber via the spray hole during operation, in which case there is a malfunction. However, the gas or the air may also be a residual quantity, already present in the compression chamber, which has not been completely displaced when the compression chamber was filled with the molten material. The reason for this can be small corners and/or undercuts, while the wettability of the adjacent surfaces likewise plays a role.

SUMMARY OF THE INVENTION

Proceeding from the aforementioned prior art, it is the underlying object of the present invention to improve the reproducibility of drop formation in the generative manufacture of a three-dimensional workpiece from a molten material, in particular a molten metal.

In the proposed method for the generative manufacture of a three-dimensional workpiece from a molten material, in particular a molten metal, the molten material is fed to a compression chamber and discharged in drop form via a spray hole by means of a pressure pulse generated by means of a reciprocating piston that delimits the compression chamber. According to the invention, the compression chamber is degassed before manufacturing begins and/or during a pause in manufacture. In a first step of this method, ultrasonic waves are coupled into the molten material in the compression chamber, which generate a force $F_{Bjrk}$ that makes the gas in the molten material sink. In a second step of this method, after the ultrasonic excitation has ended, the piston is moved deeper into the compression chamber in order to discharge the gas, which is then rising, via a guide for the piston.

Owing to the fact that, in the method according to the invention, the compression chamber is degassed before manufacturing begins and/or during a pause in manufacture, the compression chamber is at least approximately free of highly compressible media, such as air. This ensures that, on the one hand, the pressure required for discharging the molten material can be built up in the compression chamber and, on the other hand, that constant drop sizes are produced. This means that the required reproducibility of drop formation is provided.

To degas the compression chamber, ultrasonic waves, that is to say high-frequency oscillations, are coupled into the molten material. This transmits the oscillations to the gas enclosed as a gas bubble in the molten material and/or adhering to an adjacent surface. If the latter is the case, the gas is first detached from the surface by means of the oscillations, with the result that a gas bubble enclosed in the molten material is formed. During the ultrasonic excitation, different forces act on a gas bubble enclosed in the molten material, and the sum of these forces leads to the gas bubble sinking. This means that it approaches the spray hole. If the ultrasonic excitation is then terminated, the gas bubble rises, moving away from the spray hole in the direction of the piston.

The sinking of the gas bubble during ultrasonic excitation is due, in particular, to a force $F_{Bjrk}$ ("Bjerknes force"). If the ultrasonic excitation is terminated, this force disappears and a buoyancy force $F_{Bou}$ ultimately leads to the gas bubble rising in the molten material.

In order to discharge the gas bubble rising in the molten material, the piston is then moved deeper into the compression chamber in a further method step. If the piston has already been extended to the maximum extent, it is first moved in the reverse direction, that is to say is pulled out of the compression chamber, and is only then moved deeper into the compression chamber. The piston stroke in this process can be one or more millimeters. This means that the discharge of the gas bubble or bubbles after ultrasonic excitation is effected by means of a macroscopic piston stroke.\

The ultrasonic waves are preferably coupled into the molten material by means of the reciprocating piston. For this purpose, the piston is set into high-frequency oscillation, preferably into an oscillation of about 20 kHz or more. During this process, the piston can undergo an acceleration of 2,000 g or more.

It is furthermore proposed that the piston be set into oscillation and/or moved backward and forward by means of an actuator, for example by means of a magnetostrictive, piezoceramic and/or magnetic actuator. If the actuator merely serves to move the piston backward and forward, in particular to effect macroscopic piston strokes, any actuator can be selected. In order to achieve high-frequency piston oscillation, a piezoceramic actuator is preferably used since it permits particularly small strokes and, at the same time, high forces. Advantageously, the reciprocating movement of the piston to discharge the molten material through the spray hole during the manufacture of a three-dimensional workpiece and the high-frequency oscillations of the piston to couple in ultrasonic waves before the beginning of manufacture and/or during a pause in manufacture are brought about with the same actuator. The same actuator can also be used to achieve a macroscopic piston stroke in order to discharge gas bubbles present in the molten material after ultrasonic excitation.

As a further development of the invention, it is proposed that, before the ultrasonic excitation, the molten material present in the region of the spray hole is cooled down until it falls below the solidus line of the molten material. This means that the molten material is cooled down in the region of the spray hole to such an extent that it solidifies. This ensures that no molten material is discharged via the spray hole before manufacture begins.

The molten material present in the region of the spray hole is preferably cooled down with molecular nitrogen ($N_2$). The molecular nitrogen ($N_2$) is preferably fed to the spray hole from the outside by means of a lance, ensuring that locally limited cooling is achieved. This means that the solidified molten material can be liquefied again more quickly after the degassing of the compression chamber.

The device further proposed for carrying out the method according to the invention comprises a compression chamber which can be filled with a molten material, in particular a molten metal, and which is delimited, on the one hand, by a reciprocating piston and, on the other hand, by a ceramic body with a spray hole for discharging the molten material. The device further comprises an actuator, for example a magnetostrictive, piezoceramic and/or magnetic actuator, by means of which the piston can be set into high-frequency oscillation and/or moved backward and forward. Here, the piston of the device has an at least sectionally conically shaped tip for delimiting the compression chamber. That is to say that it is possible, in particular, for the tip to be shaped in the form of a cone or in the form of a truncated cone. As it is moved into the compression chamber, the at least sectionally conically shaped tip of the piston promotes "stripping" of gas bubbles, enabling said gas bubbles to be detached easily from the piston and to rise along the side of the piston in order then to be discharged via the piston guide.

The actuator is preferably a piezoceramic actuator, by means of which the piston can both be set into high-frequency oscillation and moved backward and forward. In this case, only one actuator has to be provided, or the device does not have to be expanded with an additional actuator to carry out the method according to the invention for degassing the compression chamber.

This means that the actuator is preferably capable of high frequency, enabling the piston to be set into high frequency oscillations ≥20 kHz by means of the actuator.

It is advantageous if the piston is manufactured from ceramic and thus has a high strength. The connection of the piston to the actuator is preferably established via a piston rod, which, in particular, can be produced from a metallic material. Depending on its length, the piston rod can be of one- or multi-part design. In the case of a multi-part embodiment, a sufficient expansion length should be provided in the connection region in order to prevent detachment of the connection due to thermally induced changes in length. At the same time, the connection of the piston to the actuator must be sufficiently rigid to enable the piston to be set into high-frequency oscillation. In addition, extra strong restoring springs can be provided, which preload the piston against the actuator. To ensure that the high positive and negative accelerations do not lead to impermissible stresses in the piston, care should be taken to ensure that only compressive stresses, not tensile stresses, are introduced into the ceramic. In addition, there should be no use of sharp edges, in particular a thread, in the force introduction region.

BRIEF DESCRIPTION OF THE DRAWINGS

The invention is explained in greater detail below with reference to the attached drawings. In the drawings.

DETAILED DESCRIPTION

Figure 1:
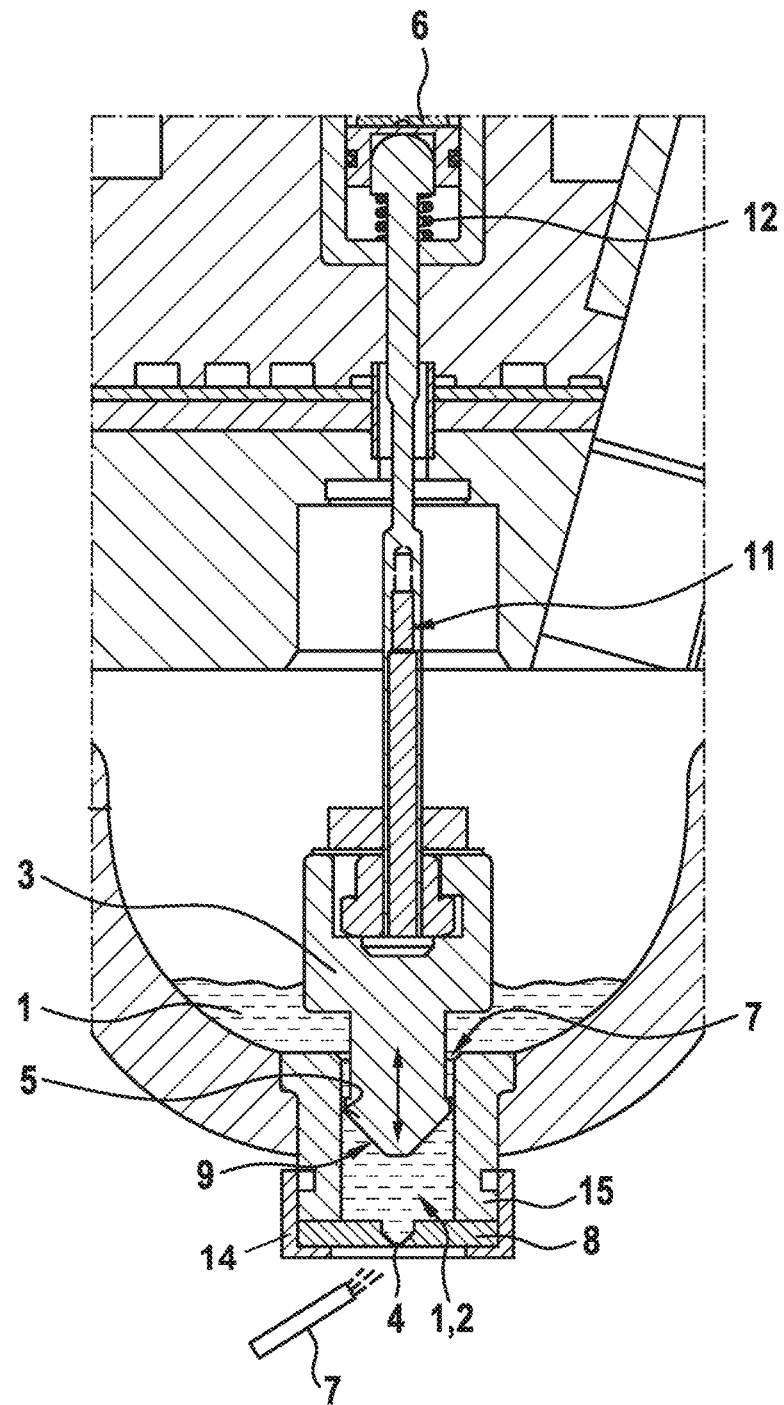
FIG. 1 shows a schematic longitudinal section through a device according to invention for the generative manufacture of a three-dimensional workpiece from a molten material.
Figure 2:
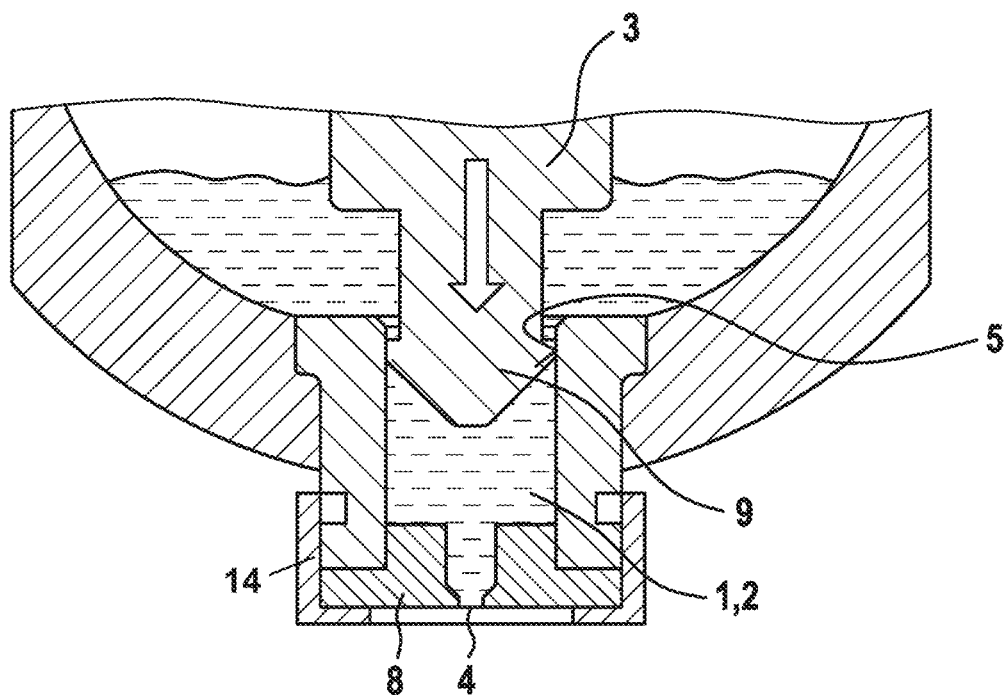
FIG. 2 shows an enlarged detail of FIG. 1.

FIGS. 1 and 2 show, by way of example, a preferred embodiment of a device according to the invention for the generative manufacture of a three-dimensional workpiece from a molten material 1, in particular from a molten metal. The device is a 3D printer or a print head of a 3D printer.

Components of the device are a reciprocating piston 3 which delimits a compression chamber 2. The compression chamber 2 is filled with the molten material 1. As a result of the reciprocating movements of the piston 3 (see FIG. 1, arrow in the piston 3), pressure pulses are generated which result in some of the molten material 1 being discharged via a spray hole 4 formed in a ceramic body 8 delimiting the compression chamber 2. The ceramic body 8, which in the present case is plate-shaped, is connected via a clamping sleeve 14 to a hollow-cylindrical housing part 15, which delimits the compression chamber 2 in the radial direction.

The spray hole 4 formed in the ceramic body 8 has a diameter D which is less than 500 μm. This means that a significant pressure pulse is required to force the molten material 1 through the narrow spray hole 4. The pressure pulse is generated by means of the piston 3, which is connected for this purpose to a piezoceramic actuator 6 via a multi-part piston rod 11. The piston rod 11 and the piston 3 are preloaded against the actuator 6 by means of at least one spring 12.

As the molten material 1 emerges from the spray hole 4, discrete drops are formed, which separate from the underside of the ceramic body 8 and move in free fall toward a workpiece support (not shown). The line of fall in the free fall ideally corresponds to the longitudinal axis of the spray hole 4 in order to allow the drops to be placed accurately on the workpiece support. The three-dimensional workpiece to be manufactured is thus built up drop by drop on the workpiece support.

In order to force the molten material 1 out of the compression chamber 2 via the spray hole 4, a sufficiently high pressure or pressure pulse must be built up. This is only possible if there is no highly compressible medium, such as air, in the compression chamber 2. During operation of the device, however, it may happen that air is sucked in from outside via the spray hole 4 and thus gets under the piston 3. This air must be removed before the device is put into operation.

This means that—in accordance with the method according to the invention—the compression chamber 2 is degassed before the actual manufacture of a three-dimensional workpiece begins. For this purpose, the piston 3 is set into high-frequency oscillation, by means of which ultrasonic waves are coupled into the molten material 1. The molten material 1 transmits the oscillations to the enclosed gas, with the result that this gas sinks as a gas bubble 10 in the molten material 1. The sinking is due to a force $F_{Bjrk}$ which acts on the gas bubble, more specifically counter to a buoyancy force $F_{Bou}$. At the same time, any gas bubbles 10 which adhere to the inner circumferential surface of the housing part 15 are detached and thus likewise sink. If the ultrasonic excitation is then terminated and the piston 3 is moved deeper into the compression chamber 2 (see FIG. 2, arrow in the piston 3), it being possible for the piston stroke to be one to several millimeters, the gas bubbles 10 rise upward as a result of the buoyancy force $F_{Bou}$ and are discharged from the compression chamber 2 via a guide 5 for the piston 3. The discharge of the gas bubbles 10 is promoted by the conically shaped tip 9 of the piston 3.

To ensure that no molten material 1 is discharged via the spray hole 4 as the piston 3 is moved into the compression chamber 2, the molten material 1 located in the region of the spray hole 4 is first intensively cooled or frozen. For this purpose, the region of the spray hole 4 is flushed from the outside with molecular nitrogen $N_2$, it being possible to use a lance 7 for the flushing (see FIG. 1). Once the degassing process has been completed, the frozen molten material 1 is then heated up again and liquefied, making it possible to start the actual manufacture of the three-dimensional workpiece.

Figure 3:
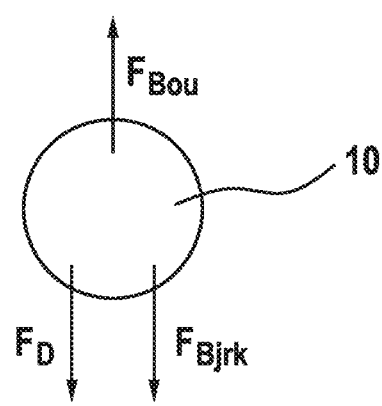
FIG. 3 shows a schematic illustration of the forces which act on a gas bubble within a liquid.

FIG. 3 illustrates, by way of example, the forces which act on a gas bubble 10 enclosed in the liquid during the coupling of ultrasonic waves into a liquid. Initially, a buoyancy force $F_{Bou}$ acts, and, without ultrasonic excitation, this would lead to the gas bubble 10 rising in the liquid. The buoyancy force $F_{Bou}$ is counteracted by a force $F_D$ ("drag force") and a force $F_{Bjrk}$ ("Bjerknes force"), which together are greater than the buoyancy force $F_{Bou}$, causing the gas bubble 10 to sink in the liquid.

The present invention makes use of this phenomenon, with only the buoyancy force $F_{Bou}$ being used for the final discharge of the gas bubbles 10 from the compression chamber 2.

What is claimed is:

1. A method for the generative manufacture of a three-dimensional workpiece from a molten material (1), wherein the molten material (1) is fed to a compression chamber (2) and discharged in drop form via a spray hole (4) by a pressure pulse generated by a reciprocating piston (3) that delimits the compression chamber (2), the method comprising degassing the compression chamber (2) before manufacturing begins and/or during a pause in manufacture, wherein, in a first step, ultrasonic waves are continuously applied into the molten material (1) present in the compression chamber (2), which generate a force ($F_{Bjrk}$) that makes gas in the molten material (1) sink, and, in a second step, after ultrasonic excitation has ended, the piston (3) is moved deeper into the compression chamber (2) in order to discharge the gas, which is then rising, via a guide (5) for the piston (3).

2. The method as claimed in claim 1,
   wherein the ultrasonic waves are continuously applied into the molten material (1) by the piston (3), which is set into high-frequency oscillation for this purpose.

3. The method as claimed in claim 2,
   wherein the piston (3) is set into oscillation and/or moved backward and forward by an actuator (6).

4. The method as claimed in claim 1,
   wherein, before the ultrasonic excitation, the molten material (1) present in a region of the spray hole (4) is cooled down until the molten material falls below a solidus line of the molten material (1).

5. The method as claimed in claim 4,
   wherein the molten material (1) present in the region of the spray hole (4) is cooled down with molecular nitrogen ($N_2$).

6. The method as claimed in claim 2, wherein the piston (3) is set into oscillation and/or moved backward and forward by a magnetostrictive, piezoceramic and/or magnetic actuator (6).

7. The method as claimed in claim 4, wherein the molten material (1) present in the region of the spray hole (4) is cooled down with molecular nitrogen ($N_2$), which is fed to the spray hole (4) from an outside by a lance (7).

8. The method as claimed in claim 1, wherein the compression chamber (2) is degassed before manufacturing begins.

9. The method as claimed in claim 1, wherein the compression chamber (2) is degassed during a pause in manufacture.

10. The method as claimed in claim 1, wherein the compression chamber (2) is degassed before manufacturing begins and during a pause in manufacture.

11. A device for carrying out the method as claimed in claim 1, comprising a compression chamber (2) which is filled with a molten material (1), and which is delimited on one end by a reciprocating piston (3) and on another end by a ceramic body (8) with a spray hole (4) for discharging the molten material (1), and further comprising an actuator (6) by which the piston (3) is set into high-frequency oscillation and/or moved backward and forward, wherein the piston (3) has at least a sectionally conically shaped tip (9) for delimiting the compression chamber (2).

12. The device as claimed in claim 11,
    wherein the actuator (6) is capable of high frequency oscillation, enabling the piston (3) to be set into high frequency oscillations ≥20 kHz by the actuator (6).

13. The device as claimed in claim 11,
    wherein the piston (3) is manufactured from ceramic and/or is connected to the actuator (6) via a one-part or multi-part piston rod (11).

14. A method for the generative manufacture of a three-dimensional workpiece from a molten metal, wherein the molten metal is fed to a compression chamber (2) and discharged in drop form via a spray hole (4) by a pressure pulse generated by a reciprocating piston (3) that delimits the compression chamber (2), the method comprising degassing the compression chamber (2) before manufacturing begins and/or during a pause in manufacture, wherein, in a first step, ultrasonic waves are continuously applied into the molten metal present in the compression chamber (2), which generate a force ($F_{Bjrk}$) that makes gas in the molten metal sink, and, in a second step, after ultrasonic excitation has ended, the piston (3) is moved deeper into the compression chamber (2) in order to discharge the gas, which is then rising, via a guide (5) for the piston (3).

15. The method as claimed in claim 14, wherein
    the ultrasonic waves are continuously applied into the molten metal by the piston (3), which is set into high-frequency oscillation for this purpose.

16. The method as claimed in claim 15, wherein the piston (3) is set into oscillation and/or moved backward and forward by an actuator (6).

17. The method as claimed in claim 14, wherein, before the ultrasonic excitation, the molten metal present in a region of the spray hole (4) is cooled down until the molten metal falls below a solidus line of the molten metal.

18. The method as claimed in claim 17, wherein the molten metal present in the region of the spray hole (4) is cooled down with molecular nitrogen ($N_2$).

19. The method as claimed in claim 15, wherein the piston (3) is set into oscillation and/or moved backward and forward by a magnetostrictive, piezoceramic and/or magnetic actuator (6).

20. The method as claimed in claim 17, wherein the molten metal present in the region of the spray hole (4) is cooled down with molecular nitrogen ($N_2$), which is fed to the spray hole (4) from an outside by a lance (7).

\* \* \* \* \*